K. E. ENGLUND.
ADJUSTABLE BAND.
APPLICATION FILED JAN. 18, 1921.
1,414,731. Patented May 2, 1922.
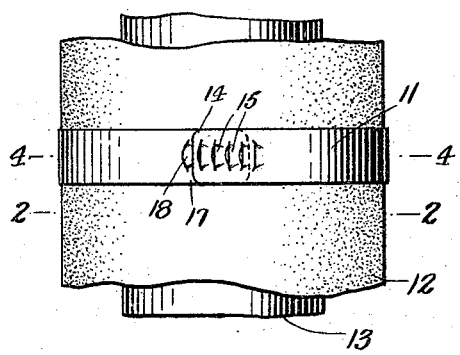
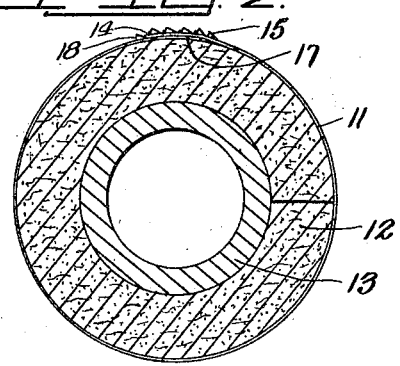
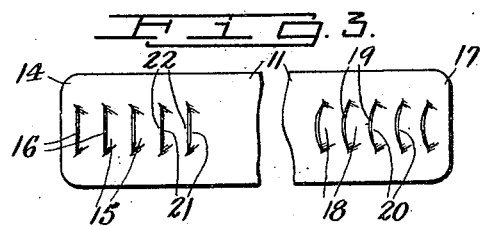
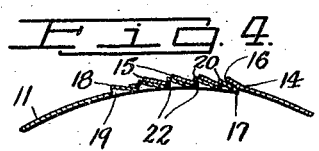
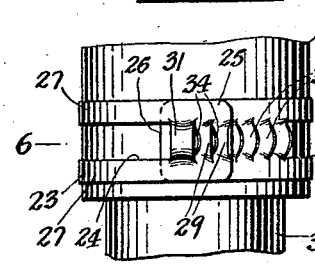
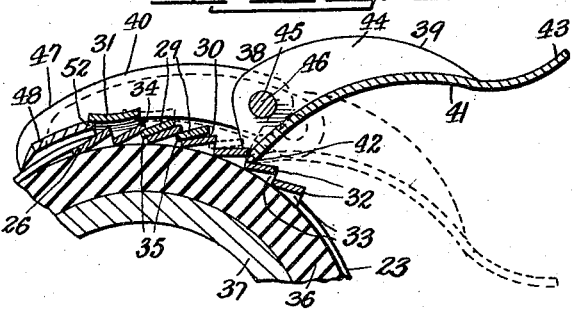
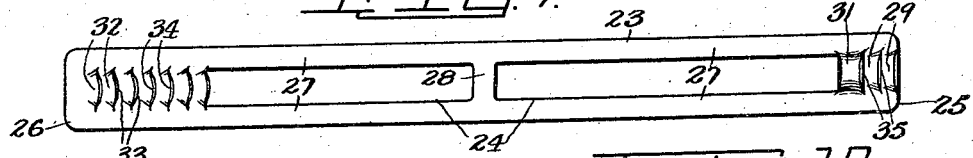
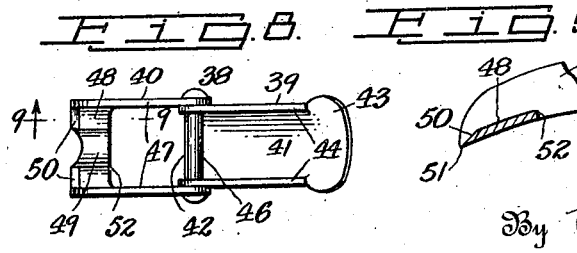
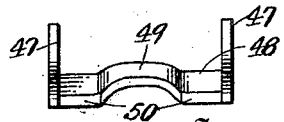
Inventor
Knut E. Englund
By his Attorneys

UNITED STATES PATENT OFFICE.

KNUT E. ENGLUND, OF BROOKLYN, NEW YORK, ASSIGNOR TO ROBERT H. GAY, OF NEW YORK, N. Y.

ADJUSTABLE BAND.

1,414,731. Specification of Letters Patent. Patented May 2, 1922.

Application filed January 18, 1921. Serial No. 438,195.

*To all whom it may concern:*

Be it known that I, KNUT E. ENGLUND, a citizen of the United States, and residing at Brooklyn, in the county of Kings and State of New York, have invented certain new and useful Improvements in Adjustable Bands, of which the following is a specification, such as will enable those skilled in the art to which it appertains to make and use the same.

This invention relates to adjustable bands, and particularly to devices of this class adapted for use in securing flexible tubings, wrappings and the like in connection with a pipe or pipes of various kinds and classes, and the object of the invention is to provide a band of the class specified which is so constructed as to securely clamp a flexible tubing or the like in position, the band being provided at its end portions with interlocking members which securely hold the band in position; a further object of the invention being to provide a suitable tool or implement by means of which the separate end portions of the band may be moved upon each other to securely mount the band in position and for removing the band whenever desired; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a part of a pipe with an asbestos or other wrapping thereon and showing one of my improved bands for holding the wrapping in position;

Fig. 2 a section on the line 2—2 of Fig. 1;

Fig. 3 a detail plan view of the band shown in Figs. 1 and 2 on an enlarged scale and with part of the construction broken away;

Fig. 4 a partial section on the line 4—4 of Fig. 1 on an enlarged scale;

Fig. 5 a plan view of a flexible tubing mounted in connection with a suitable pipe and showing another form of band for securing the tubing in connection with said pipe;

Fig. 6 a partial section on the line 6—6 of Fig. 5 on an enlarged scale and showing a tool which I employ for firmly securing the band in position;

Fig. 7 a detail plan view of the band shown in Figs. 5 and 6 in an extended position;

Fig. 8 a plan view of the tool shown in Fig. 6 and on a reduced scale;

Fig. 9 a partial section on the line 9—9 of Fig. 8 on an enlarged scale; and,

Fig. 10 a front edge view of one of the parts of the tool shown in Figs. 6 and 8.

In Figs. 1 to 4 inclusive, I have illustrated at 11 one form of my improved adjustable band and in Figs. 1 and 2 I have shown, for the purpose of illustration, one use of the band 11 in which an asbestos or other wrapping 12 is mounted and held in position on a pipe 13 by one or more of the bands 11. It is customary to employ asbestos or other wrapping in connection with steam, hot water and hot air pipes of various kinds and classes, and metallic or other bands are commonly employed for holding said wrappings in connection with the pipes but all of such bands, as now constructed, or now upon the market, are complicated in construction and the manufacture thereof involves a considerable expense.

The band 11 is made from an elongated strip of sheet metal and one end portion 14 thereof is fashioned to form a plurality of projecting members 15, forming recesses or apertures 16, and the other end portion 17 of the band is also fashioned to form a plurality of projecting members 18 forming recesses or apertures 19 in said band. The projecting members 18 or the edge portions thereof are preferably round as shown at 20, while the edge portions of the projecting members 17 are straight as indicated at 21 in Fig. 3 of the drawing.

It will be understood that in the use of the band 11 herein shown and described, the same will be composed of comparatively thin and flexible metal to readily permit of its attachment onto a pipe wrapping in the manner illustrated in Figs. 1 and 2, and in this operation the end portion 14 is placed over the end portion 17 thereof, and said end portions are moved by hand or otherwise longitudinally of each other, or one of said end portions moved longitudinally of the other, and when in proper position the projecting members 18 on the end portion 17 pass into the apertures 16 in the end portion 14, as clearly shown in Fig. 4 of the drawing, and in this operation the rounded edge portions 20 of the projecting members 18 overlap the rear edges 22 of the projecting members 15 and the separate end portions 14 and 17 of the band are thus firmly held together.

By reason of the fact that no material pressure or compression is required to hold the wrapping 12 in position, the band 11 may be mounted thereon by hand and if it becomes necessary to remove the band all that is necessary will be to move the end portion 14 longitudinally of the end portion 17 to release the rounded edge portions 20 of the projecting members 18 from the rear edge portions 22 of the projecting members 15. It will be apparent that I am not necessarily limited to the specific use of the band 11 herein shown and described, as said band may be used for various other purposes than that herein specified.

In the construction shown in Figs. 5 to 10 inclusive, I have shown a modified form of construction in which I employ a band 23 shown in detail in Fig. 7 of the drawing, and this band, in the form of construction shown, is fashioned from an elongated strip of sheet metal, the body portion of which is cut out as shown at 24 to form between the end portions 25 and 26 of said band, band members 27 joined approximately centrally thereof by a transverse member 28. The end portion 25 of the band 23 is provided with a plurality of projecting members 29 forming corresponding recesses or apertures 30 and rearwardly of said projecting members the end portion 25 of the band is provided with a raised arc-shaped lug 31 which projects above the band 23 a greater distance than the members 29.

The other end portion 26 of the band is provided with a plurality of projecting members 32 forming corresponding recesses or apertures 33 in said end portion, and the edge portions 34 of the projecting members 32 are preferably rounded as shown in Fig. 7 of the drawing so that when the separate end portions 25 and 26 are overlapped and interlocked as shown in Figs. 5 and 6, the arc-shaped edge portions 34 will overlap the inner edge portions 35 of the projecting members 29 as clearly illustrated in Fig. 6 of the drawing.

The band 23 as shown in Fig. 7 is preferably designed for use in securing a flexible hose or tubing 36 in connection with one or more pipes 37 to form a coupling member therefor, and also to produce a liquid-tight connection between the tubing 36 and pipe or pipes 37. In mounting the band 23 in the position shown in Figs. 5 and 6 of the drawing, the end portion 25 of said band is placed over the end portion 26 thereof, and the end portion 25 moved longitudinally of the end portion 26 by hand to bring one or more of the projecting members 32 in position to pass into one or more of the apertures 30 formed by the projecting members 29 with the arc-shaped edge portions 34 of said member or members overlapping the inner edge portion 35 of one or more of the projecting members 29. With the band in this position a tool 38 similar to that shown in Figs. 6 and 8 of the drawing is employed for moving the end portion 25 longitudinally of the end portion 26 so that the band 23 may be mounted in such manner that the flexible tubing 36 will be firmly compressed upon the pipe 37 and held in such position. The operation of moving the end portion 25 longitudinally of the end portion 26, as above set out by the tool 38 is indicated in dotted lines in Fig. 6 of the drawing.

The tool 38 is composed of two parts 39 and 40 preferably formed from sheet metal, the part 39 comprising a curved base 41 one edge portion 42 of which is adapted to cooperate with the projecting members 32 of the end portion 26 of the band and the other end portion of the base is fashioned to form a finger piece 43. The base 41 is provided at its opposite sides with upwardly directed and curved flanges 44 which extend from the edge portion 42 to a predetermined distance from the end portion 43 of said band, and said flanges are provided with apertures 45 through which a rivet pin 46 passes. The part 40 of the tool 38 is yoke-shaped in form and composed of parallel side flanges 47 joined at one end by a cross head 48, and the other end portions of said flanges are apertured to permit of the passage of the pin 46 therethrough whereby the separate parts 39 and 40 of the tool are pivotally connected. The cross head 48 of the part 40 is provided with a central upwardly directed arc-shaped portion 49 at the opposite sides of which the outer edge of the cross head 48 is beveled as shown at 50 in Figs. 8 and 9 of the drawing to form a sharp edge 51.

In the use of the tool 38, as hereinbefore set out for properly attaching or mounting the band 23 in position, the rear edge portion 52 of the cross head 48 of the part 40 is placed beneath or in engagement with the projecting lug 31 as shown in Fig. 6 of the drawing, after which the edge portion 42 of the part 39 is brought in position to engage one of the projecting members 32 as illustrated in said figure, after which the part 39 or the finger piece 43 thereof is grasped by an operator and forced downwardly into the position indicated in dotted lines in Fig. 6 to advance the projecting members 29 on the end portion 25 of the band one notch or step as is indicated in dotted lines in said figure.

It will be understood that the extent of the movement of the end portion 25, as above set out, will depend largely upon the amount of compression required for properly securing the flexible tubing 36 in position. The sharp edge portion 51 of the part 40 of the tool is designed to be used in removing the band 23 from the flexible tubing in which said edge portion or portions may be inserted beneath the end portion 25 of the band for disengaging the projecting members 32 from said end portion. This result may also be accomplished, however, by the use of the complete tool in the manner of attaching the band in position.

It will be understood that the arc-shaped portion 49 on the part 40 of the tool as well as the cut out portions 24 in the band members 27 are provided to permit of the passage of the projecting members 32 longitudinally of the end portion 25 and the apertures or cut-out portions 24 which produce the separate band member 27 facilitate a firmer and more positive compression of the flexible tubing 36. It will be understood that while I have shown two forms and two different uses of my improved adjustable band, I am not necessarily limited to the specific form and construction of the separate bands herein shown and described, nor to any specific use thereof, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. An adjustable band of the class described, the end portions of which are provided with a plurality of transverse projecting members fashioned from the material of said band and forming corresponding transverse apertures therein, and the front edges of the projecting members on one end portion of said band being arc-shaped in form and adapted to engage the rear edges of the projecting members on the other end portion of said band when said end portions are brought together and overlapped to securely hold said end portions together in different positions of adjustment.

2. An adjustable band of the class described, the end portions of which are provided with a plurality of transverse projecting members fashioned from the material of said band and forming corresponding transverse apertures therein, and the front edges of the projecting members on one end portion of said band being arc-shaped in form and adapted to engage the rear edges of the projecting members on the other end portion of said band when said end portions are brought together and overlapped to securely hold said end portions together in different positions of adjustment, and means on one end portion of said band adapted to receive a suitable tool for moving said end portions one upon the other in the operation of interlocking the projecting members thereof.

In testimony that I claim the foregoing as my invention I have signed my name in presence of the subscribing witnesses this 15th day of January, 1921.

KNUT E. ENGLUND.

Witnesses:
C. E. MULREANY,
H. E. THOMPSON.